United States Patent
Zhong et al.

(10) Patent No.: US 11,556,824 B2
(45) Date of Patent: Jan. 17, 2023

(54) METHODS FOR ESTIMATING ACCURACY AND ROBUSTNESS OF MODEL AND DEVICES THEREOF

(71) Applicant: FUJITSU LIMITED, Kawasaki (JP)

(72) Inventors: Chaoliang Zhong, Beijing (CN); Wensheng Xia, Beijing (CN); Ziqiang Shi, Beijing (CN); Jun Sun, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 201 days.

(21) Appl. No.: 16/902,756

(22) Filed: Jun. 16, 2020

(65) Prior Publication Data

US 2021/0073665 A1 Mar. 11, 2021

(30) Foreign Application Priority Data

Sep. 6, 2019 (CN) .......................... 201910842132.1

(51) Int. Cl.
| | |
|---|---|
| *G06N 3/08* | (2006.01) |
| *G06K 9/62* | (2022.01) |
| *G06N 7/00* | (2006.01) |
| *G06N 20/00* | (2019.01) |
| *G06N 3/04* | (2006.01) |

(52) U.S. Cl.
CPC ............. *G06N 7/00* (2013.01); *G06K 9/6268* (2013.01); *G06N 3/0454* (2013.01); *G06N 3/088* (2013.01); *G06N 7/005* (2013.01); *G06N 20/00* (2019.01)

(58) Field of Classification Search
CPC .... G06K 9/6268; G06N 20/00; G06N 3/0454; G06N 3/088; G06N 7/00; G06N 7/005
See application file for complete search history.

(56) References Cited

U.S. PATENT DOCUMENTS

2015/0112900 A1* 4/2015 Ariyoshi ................ G06N 20/00
706/46

FOREIGN PATENT DOCUMENTS

WO      WO-2020078818 A1 *  4/2020 ............. G06N 20/00

* cited by examiner

*Primary Examiner* — Roy Y Yi
*Assistant Examiner* — Geoffrey T Evans
(74) *Attorney, Agent, or Firm* — Staas & Halsey LLP

(57) ABSTRACT

The present disclosure relates to methods for estimating an accuracy and robustness of a model and devices thereof. According to an embodiment of the present disclosure, the method comprises calculating a parameter representing a possibility that a sample in the first dataset appears in the second dataset; calculating an accuracy score of the model with respect to the sample in the first dataset; calculating a weighted accuracy score of the model with respect to the sample in the first dataset, based on the accuracy score, by taking the parameter as a weight; and calculating, as the estimation accuracy of the model with respect to the second dataset, an adjusted accuracy of the model with respect to the first dataset according to the weighted accuracy score.

14 Claims, 7 Drawing Sheets

METHODS FOR ESTIMATING ACCURACY AND ROBUSTNESS OF MODEL AND DEVICES THEREOF

CROSS-REFERENCE TO RELATED APPLICATIONS

This application claims the priority benefit of Chinese Patent Application No. 201910842132.1, filed on Sep. 6, 2019 in the China National Intellectual Property Administration, the disclosure of which is incorporated herein in its entirety by reference.

FIELD

The present disclosure relates to evaluation of a model for artificial intelligence, and particularly, to methods for estimating an accuracy and robustness of a model and devices thereof.

BACKGROUND

With the development of deep learning technology, artificial intelligence (AI) models have been widely applied in various scenarios such as autonomous driving, face recognition, handwritten character recognition, health management and the like. When an AI model (also referred to as a "model" for short in this disclosure) is applied in an actual scenario, the quality of the model is important.

Characterization parameters of the quality of the model include an accuracy of the model. The accuracy of the model is defined, for example, as a ratio of the number of correct output results to the total number of output results among model output results for an object dataset.

FIG. 1 shows a flowchart of a conventional exemplary method 10 for determining an accuracy of a model. In operation S101, a model is trained with a training set selected from a source dataset. In operation S103, the model is tested with a test set selected from the source dataset. In operation S105, the accuracy of the model is determined according to test results, wherein the model here refers to a trained model, and samples in the test set have been assigned with labels, thereby making it possible to determine whether the test results outputted by the model are correct with respect to the labels. Preferably, the data in the test set is data that has never appeared in the training set. The source dataset can also include a validation set, which is used to select a model with the best accuracy.

SUMMARY

A brief summary of the present disclosure will be given below to provide a basic understanding of some aspects of the present disclosure. It should be understood that the summary is not an exhaustive summary of the present disclosure. It does not intend to define a key or important part of the present disclosure, nor does it intend to limit the scope of the present disclosure. The object of the summary is only to briefly present some concepts, which serves as a preamble of the more detailed description that follows.

According to an aspect of the present disclosure, there is provided a method for estimating an estimation accuracy of a model for classifying which is trained with a first dataset with respect to a second dataset. The method comprises: calculating a parameter representing a possibility that a sample in the first dataset appears in the second dataset; calculating an accuracy score of the model with respect to the sample in the first dataset; calculating a weighted accuracy score of the model with respect to the sample in the first dataset, based on the accuracy score, by taking the parameter as a weight; and calculating, as the estimation accuracy of the model with respect to the second dataset, an adjusted accuracy of the model with respect to the first dataset according to the weighted accuracy score.

According to an aspect of the present disclosure, there is provided a method for estimating a robustness of a model for classifying which is trained based on a first dataset, the method comprises: calculating a parameter representing a possibility that a sample in the first dataset appears in the second dataset; calculating an accuracy score of the model with respect to the sample in the first dataset; calculating a weighted accuracy score of the model with respect to the sample in the first dataset, based on the accuracy score, by taking the parameter as a weight; calculating, as an estimated accuracy of the model with respect to the second dataset, an adjusted accuracy of the model with respect to the first dataset according to the weighted accuracy score; and estimating the robustness of the model according to the accuracy of the model with respect to the first dataset and the estimated accuracy of the model with respect to the second dataset.

According to an aspect of the present disclosure, there is provided a method for estimating a comprehensive robustness of a model for classifying which is trained. The method comprises: providing a plurality of second datasets; with respect to each second dataset of the plurality of second datasets, estimating a robustness using the aforementioned method; and determining a distribution deviation between the second dataset and the first dataset used to train the model; and determining a comprehensive robustness based on the obtained multiple robustness and multiple distribution deviations.

According to an aspect of the present disclosure, there is provided a device for estimating an estimation accuracy of a model for classifying which is trained with a first dataset with respect to a second dataset. The device comprises a memory and a processor where the processor is configured to calculate a parameter representing a possibility that a sample in the first dataset appears in the second dataset; calculate an accuracy score of the model with respect to the sample in the first dataset; calculate a weighted accuracy score of the model with respect to the sample in the first dataset, based on the accuracy score, by taking the parameter as a weight; and calculate, as the estimation accuracy of the model with respect to the second dataset, an adjusted accuracy of the model with respect to the first dataset according to the weighted accuracy score.

According to another aspect of the present disclosure, there is provided a device for estimating a robustness of a model for classifying which is trained based on a first dataset. The device comprises a processor which is configured to calculate a parameter representing a possibility that a sample in the first dataset appears in the second database; calculate an accuracy score of the model with respect to the sample in the first dataset; calculate a weighted accuracy score of the model with respect to the sample in the first dataset, based on the accuracy score, by taking the parameter as a weight; calculate, as an estimated accuracy of the model with respect to the second dataset, an adjusted accuracy of the model with respect to the first dataset according to the weighted accuracy score; and estimate the robustness of the model according to the accuracy of the model with respect to the first dataset and the estimated accuracy of the model with respect to the second dataset.

According to yet another aspect of the present disclosure, there is provided a computer-readable storage medium with a program stored thereon, the program, when executed by a computer, causing the computer to implement the above method.

The methods, devices, and storage medium of the present disclosure at least can help to achieve one of the effects of: conveniently, accurately and efficiently estimating an accuracy and robustness of a model.

BRIEF DESCRIPTION OF THE DRAWINGS

Embodiments of the present disclosure will be described below with reference to the drawings, which will help to more easily understand the above and other objects, features, and advantages of the present disclosure. The drawings are only for purposes of illustrating the principles of the present disclosure. It is not necessary to draw the dimensions and relative positions of the units to scale in the drawings. The same reference numerals may denote the same features. In the drawings.

DETAILED DESCRIPTION

Figure 1:
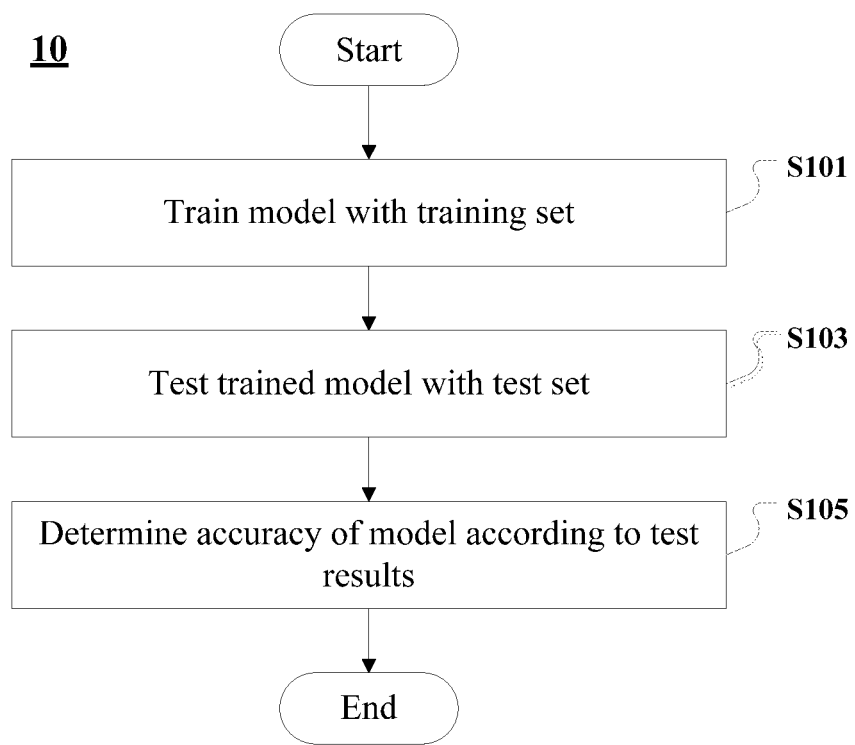
FIG. 1 shows a flowchart of a conventional exemplary method for determining an accuracy of a model.

Hereinafter, exemplary embodiments of the present disclosure will be described in conjunction with the drawings. For the sake of clarity and conciseness, the specification does not describe all features of actual embodiments. However, it should be understood that in developing any such actual embodiment, many decisions specific to the embodiments may be made in order to achieve specific objects of the developer, and these decisions may vary as the embodiments are different.

It should also be noted herein that, to avoid the present disclosure from being obscured due to unnecessary details, only those device structures closely related to the solution according to the present disclosure are shown in the drawings, while omitting other details not closely related to the present disclosure.

It should be understood that the present disclosure will not be limited only to the described implementations due to the following description made with reference to the drawings. In this disclosure, where feasible, embodiments may be combined with each other, features between different embodiments may be replaced or borrowed, and one or more features may be omitted in one embodiment.

The inventor has the following idea for an accuracy of a model. As can be seen from the description of FIG. 1, strictly speaking, the accuracy of the model described above is actually referred to with respect to a specific source dataset. For a model that has been trained with data from the source dataset, it generally will be used to process a target dataset to be analyzed, for example, to output classification results of samples in the target dataset. In actual application scenarios, there is generally a data deviation between the source dataset and the target dataset. This can result in a difference between an accuracy of the model with respect to the source dataset and an accuracy of the model with respect to the target dataset. Generally, the accuracies will decrease, for example, the former accuracy is 95% and the latter accuracy is 80%. Therefore, the following is expected: before a model is used to process the target dataset to be analyzed, an accuracy of each model with respect to the target dataset is estimated to select a model with a high accuracy. However, since the target dataset is an object to be analyzed and it is not labeled, it is difficult and challenging to directly Originated country China determine the accuracy of the model with respect to the target dataset.

After study, the inventor found that the accuracy of the model with respect to the target dataset can be estimated with a source dataset based on a probability density ratio. Correspondingly, a robustness of the model can be evaluated based on the accuracy. The robustness of the model in the present disclosure refers to the robustness of the model with respect to a data deviation, i.e., the generalization ability of the model.

In order to explain the principle of the present invention, an expression of accuracy will be first introduced below.

After careful study, the inventor recognized the following formula (1).

$$acc_{target} = E_{(x,y) \sim D_T}[\text{sign}(f(x),y)] = E_{(x,y) \sim D_S}[r(x) \cdot \text{sign}(f(x),y)] \quad (1)$$

where x is a sample; a model f for classifying performs processing on the sample x, with an outputted classification result being f(x); y is a label of the sample x (i.e., a true classification of the sample x); $D_T$ is a target dataset; $acc_{target}$ is an estimation accuracy of the model f with respect to the target dataset; $D_S$ is a source dataset; r(x) is a probability density ratio; and E[ ] is an expectation (E [ ] which appears subsequently in each case has this meaning), i.e., an arithmetic mean of the expression in the parentheses.

$$r(x) = \frac{q(x)}{p(x)} \quad (2)$$

where p(x) is a probability distribution of input samples of the source dataset, and q(x) is a probability distribution of input samples of the target dataset.

$$\text{sign}(f(x), y) = \begin{cases} 1 & \text{when } f(x) = y \\ 0 & \text{when } f(x) \neq y \end{cases} \quad (3)$$

Although formula (3) sets the function value of sign ( ) to 1 or 0, those skilled in the art can understand that it is also possible to set the function value to other values, which may lead to conventional adjustments made for the calculation formulae of the robustness and the accuracy accordingly.

In addition to the accuracy, the present invention also relates to a robustness associated with the accuracy. The robustness in the present invention will be introduced below.

According to the concept of the robustness reflecting the generalization ability, the present invention will define the robustness R with respect to the target dataset $D_T$ as formula Originated country China (4).

$$R(f, D_S, D_T) = \frac{\min(acc_{source}, acc_{target})}{acc_{source}} \cdot 100\% \quad (4)$$

where min ( ) is a function that selects a minimum value from the numerical values in the parentheses; and $acc_{source}$ is the accuracy of the model f with respect to the source dataset $D_S$.

The accuracy $acc_{source}$ of the model f with respect to the source dataset $D_S$ can be represented as formula (5).

$$acc_{source} = E_{(x,y) \sim D_S}[\text{sign}(f(x), y)] \quad (5)$$

With reference to the formulas (1) and (4), formula (6) can be obtained.

$$R(f, D_S, D_T) = \frac{\min(E_{(x,y) \sim D_S}[r(x)\text{sign}(f(x), y)],}{E_{(x,y) \sim D_S}[\text{sign}(f(x), y)])} \cdot 100\% \quad (6)$$

It can be seen that the robustness of the model can be determined based on a ratio of a smaller accuracy in the first accuracy $acc_{source}$ and the estimation accuracy $acc_{target}$ of the model with respect to the source dataset to the first accuracy.

An embodiment of the present disclosure provides a method for evaluating an estimation accuracy of a model for classifying trained with a source dataset (i.e., a first dataset, more specifically, a training set composed of data selected from the source dataset) with respect to a target dataset (i.e. a second dataset). The method will be exemplarily described below with reference to FIG. 2.

Figure 2:
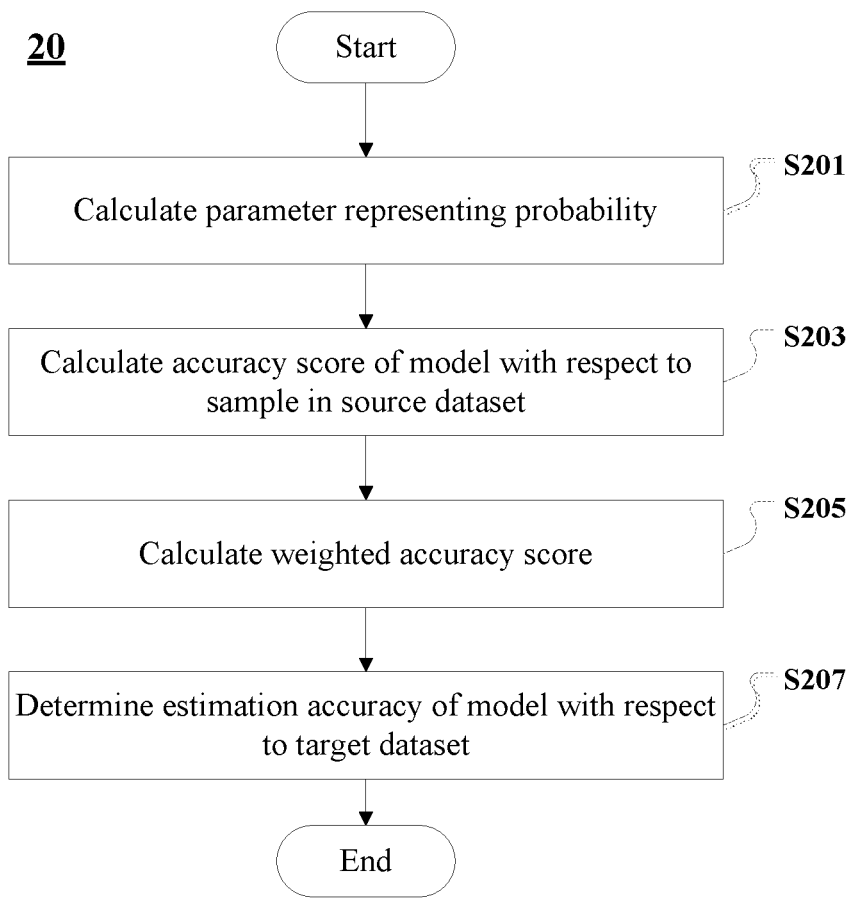
FIG. 2 shows a flowchart of a method for evaluating an estimation accuracy of a model for classifying trained with a source dataset with respect to a target dataset according to an embodiment of the present disclosure.

FIG. 2 shows a flowchart of a method 20 for evaluating an estimation accuracy of a model for classifying trained with a source dataset with respect to a target dataset. In operation S201, a parameter representing a probability that a sample in the source dataset appears in the target dataset is calculated. In an example, this parameter is a probability density ratio r (x). The probability density ratio will be further described after FIG. 2 is described.

In operation S203, an accuracy score of the model with respect to the sample in the source dataset is calculated. In an example, the accuracy score may be sign(f(x),y).

In operation S205, a weighted accuracy score of the model with respect to the sample in the source dataset is calculated, based on the calculated accuracy score, by taking the calculated parameter as a weight. In an example, the weighted accuracy score may be r(x)·sign(f(x),y).

In operation S207, an adjusted accuracy of the model with respect to the source dataset is calculated, as the estimated accuracy of the model with respect to the target dataset, according to the weighted accuracy score. In an example, the expression of the estimation accuracy is $E_{(x,y) \sim D_S}[r(x) \cdot \text{sign}(f(x), y)]$. It should be noted that in the method 20, the samples in the target dataset do not have labels.

The method 20 requires the use of a probability density ratio r (x). The more accurate the probability density ratio r (x) is, the closer the estimation accuracy will be to a true value of the accuracy. In the present invention, many traditional methods such as kernel density estimation (KDE), discriminative estimation, KL importance estimation, KMM (kernel mean matching), minimax optimization and the like may be used to estimate r(x). However, since they need to load and process all the data at once, these methods are applicable only to small datasets. In the era of deep learning and big data, datasets are usually very large. It is difficult and even impossible for traditional methods to process such large datasets.

Therefore, in an embodiment of the present invention, a probability density ratio estimation method based on a shift compensation network (SCN) is used to perform probability density ratio estimation for a dataset, especially a large dataset. The reason why this method can process a large dataset is that it is performed iteratively. In each iteration, it is only necessary to load one batch of data for processing.

The shift compensation network comprises a feature extractor G, a discriminator D, and a classifier C. The feature extractor G is used to extract features from samples in the source dataset and the target dataset. The discriminator D is used to distinguish the source dataset samples from the target dataset samples to the largest extent. The classifier C is used to classify the samples. The feature extractor G, the discriminator D, and the classifier C are all based on neural networks. A loss of the discriminator D is set as formula (7).

$$L_D = \frac{1}{2} E_{x \sim D_S}[\log(D(G(x)))] + E_{x \sim D_T}[\log(1 - D(G(x)))] \quad (7)$$

where D ( ) is an output of the discriminator D, and G ( ) is an output of the feature extractor.

It can be seen that the loss $L_D$ of the discriminator D is designed as a log-likelihood function capable of distinguishing the samples in the source dataset $D_S$ and the samples in the target dataset $D_T$. It can be proved that as long as network parameters of the discriminator D are optimized with the goal of minimizing the loss $L_D$, the trained discriminator D can be used to determine the probability density ratio r (x). See formula (8) for details.

$$r(x) = \frac{1 - D(G(x))}{D(G(x))} \quad (8)$$

It should be noted that: the shift compensation network is the prior art and is often used to obtain a model with the best performance of the corresponding classifier C, and a probability density ratio which is also referred to as a shift factor will be determined in the process of optimizing the classifier C; however, the purpose of determining the shift factor is to further optimize the classifier C, and it is not recognized that it can be used to determine the accuracy of the model. The loss Lc of the classifier C is set as formula (9), i.e., a weighted cross-entropy loss function.

$$L_C = E_{x \sim D_S}[r(x) L(C(G(x)), y)] \quad (9)$$

where L ( ) is the cross-entropy loss function.

The shift compensation network is preferably used in a case where the source dataset and the target dataset share one feature space and are different only in frequencies of samples. In most cases, the source and target datasets do not fully share the same feature space. For example, the source dataset and the target dataset of handwritten character recognition contain characters written by different persons, and different persons have different writing styles. In these cases, the source dataset and the target dataset may share a part of a feature space, but there may be a large part that is not shared, which means not only occurrence of covariate shifts with sample frequency changes but also occurrence of covariate shifts with feature changes. The conventional shift compensation networks are less applicable to such cases.

To this end, the present invention further contemplates an improved shift compensation network to obtain a more accurate probability density ratio. This will be described below with reference to FIG. 3.

Figure 3:
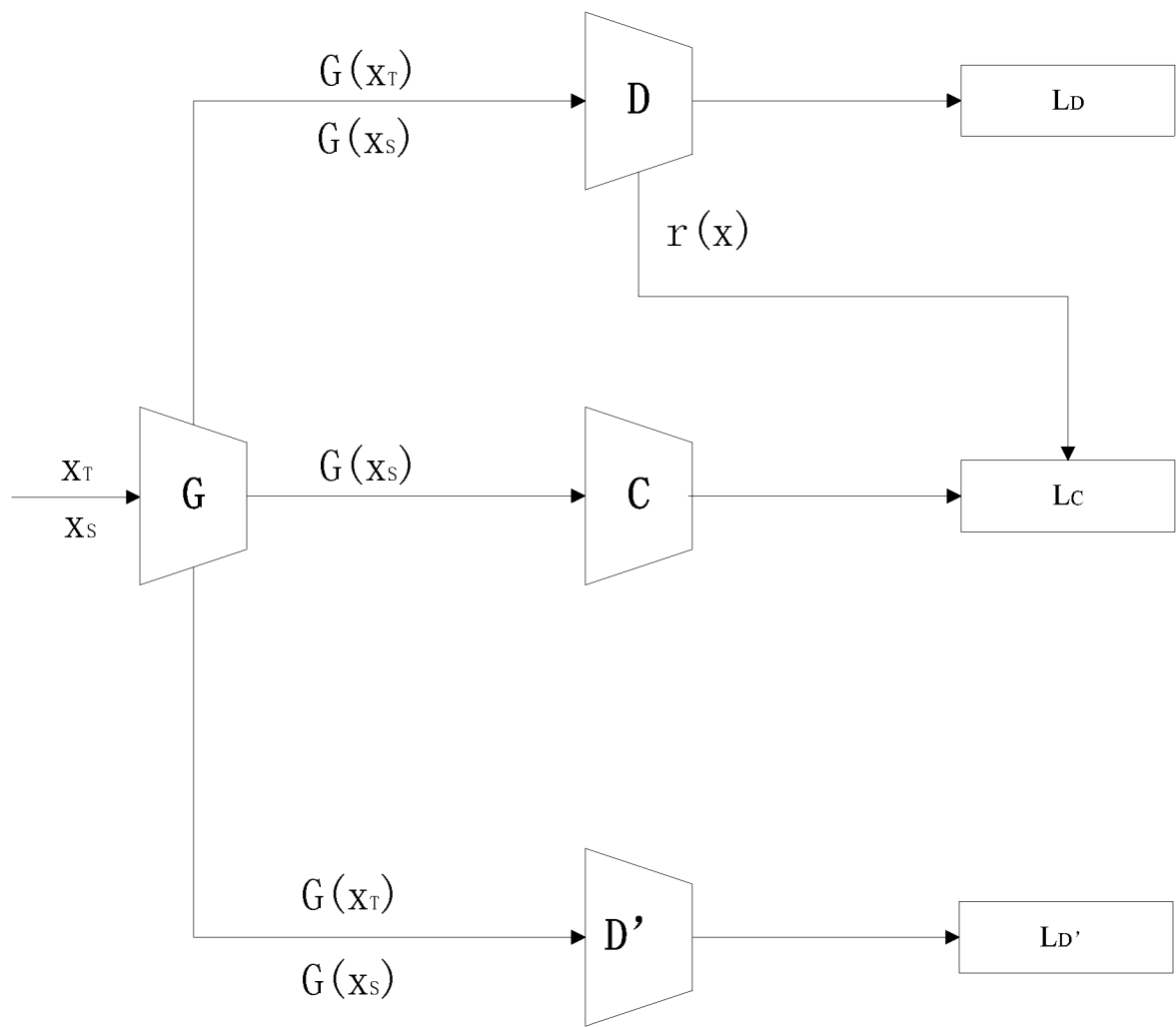
FIG. 3 shows an exemplary improved shift compensation network according to an embodiment of the present disclosure.

FIG. 3 shows an exemplary improved shift compensation network 30 according to an embodiment of the present disclosure. The shift compensation network 30 comprises a feature extractor G, a first discriminator D, a second discriminator D', and a classifier C. The feature extractor G is used to extract features from the sample x in the source dataset $D_S$ and the target dataset $D_T$. Both the first discriminator D and the second discriminator D' are used to distinguish the source dataset samples from the target dataset samples to the largest extent. The classifier C is used to classify the samples. The feature extractor G, the first discriminator D, the second discriminator D', and the classifier C are all based on neural networks. The feature extractor G is trained to be capable of extracting domain invariant features between the source dataset and the target dataset. Such features may be, for example, features of characters themselves in handwritten character recognition, instead of features of a writing style. This can allow the source dataset and the target dataset to share the same feature space.

The loss of the first discriminator D is also set as the formula (7). The loss Lc of the classifier C is also set as the weighted cross-entropy loss function shown in the formula (9). In order to obtain an accurate probability density ratio r(x), the feature extractor G and the second discriminator D' are trained in a way of being adversarial to each other. In adversarial training, the feature extractor G strives to extract so that the second discriminator D' cannot distinguish whether the features are from the source dataset or the target dataset, while the second discriminator D' does its best to distinguish based on these extracted features whether the samples are from the source dataset or the target dataset. In order to achieve such adversarial training, the loss of the second discriminator D' is set as formula (10).

$$L_{D'} = E_{x \sim D_S, D_T} \left[ d_x \log \frac{1}{D'(G(x))} + (1 - d_x) \log \frac{1}{1 - D'(G(x))} \right] \quad (10)$$

where D'( ) is an output of the second discriminator D', and $d_x$ represents a domain label of the sample x, that is, if x is from the source dataset ($x \sim D_S$), then d=1, otherwise if x is from the target dataset ($x \sim D_T$), then $d_x$=0. The formula (10) can be further simplified into formula (11).

$$L_{D'} = -(E_{x \sim D_S}[\log(D'(G(x))] + E_{x \sim D_T}[\log(1 - D'(G(x))]) \quad (11)$$

Figure 4:
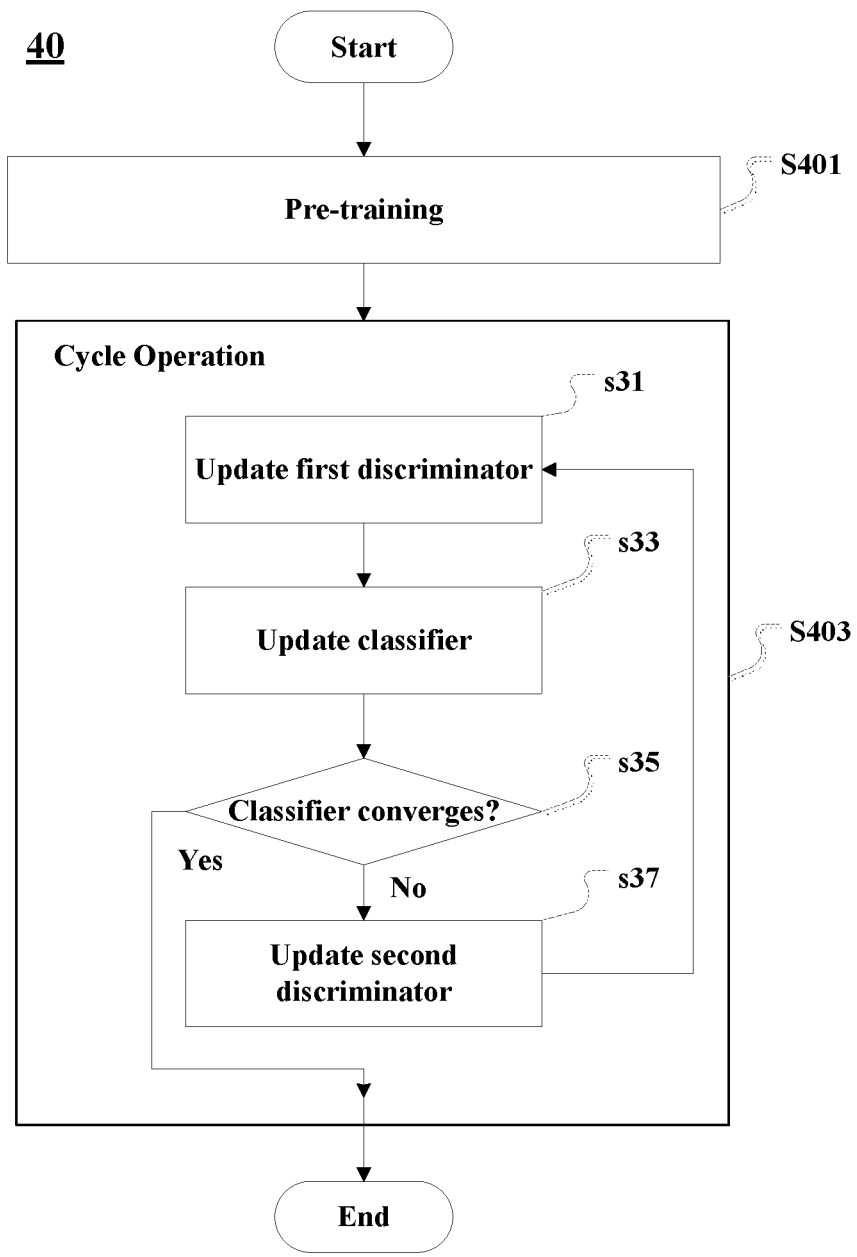
FIG. 4 shows a flowchart of a training process of an improved drift compensation network according to an embodiment of the present disclosure.

Based on the above improved neural network (i.e., the shift compensation network 30) and the loss, the shift compensation network 30 is trained. The training process is as shown in FIG. 4.

The training process 40 comprises: a pre-training operation S401 and a cycle operation S403. The cycle operation S403 comprises: a first discriminator updating operation s31, a classifier updating operation s33, a judging operation s35, and a second discriminator updating operation s37.

The feature extractor G and the classifier C are pre-trained in the pre-training operation. An objective of the pre-training is to be capable of correctly classifying samples on the source dataset. The pre-training operation is performed by minimizing the softmax cross-entropy loss function. For example, the objective function in this operation can be as follows.

$$\min_{G,C} \ E_{x \sim D_S}[L(C(G(x)), y)]$$

The pre-training is performed iteratively until the classifier C converges. Converging can mean that a value of the loss function is less than a threshold, or that a change in the accuracy of the classifier C with respect to the source dataset between two successive iterations is less than a threshold, or that a change in a weight (also referred to as a parameter) of the classifier C between two successive iterations is less than a threshold.

After the pre-training operation S401 is executed, it is necessary to execute the cycle operation S403 cyclically until the classifier C converges again, wherein in the cycle operation, an execution order of the first discriminator updating operation, the classifier updating operation, and the second discriminator updating operation can be an optional order, but once an order is selected, it is preferable to no longer change the execution order. In other words, the execution order shown in the cycle operation S403 in FIG. 4 is only an example.

In the first discriminator update operation s31, parameters of the first discriminator D and the feature extractor G are updated by maximizing the first discriminator loss function. For example, the objective function in this operation can be as follows.

$$\max_{D,G} \ L_D$$

In the classifier updating operation s33, parameters of the classifier C and the feature extractor G are updated by minimizing a combinational loss function of the classifier loss $L_C$ and the second discriminator loss $L_{D'}$. For example, the objective function in this operation can be as follows.

$$\min_{C,G} \ L_C - \lambda L_{D'}$$

where λ is a hyperparameter used to control a weight between $L_C$ and $L_{D'}$. In this classifier updating operation, a gradient from r (x) is ignored, that is, r (x) is treated as a constant.

In the judging operation s35, it is judged whether the classifier C converges. If a judgement result is "No", the process proceeds to the operation s37. If a judgement result is "YES", the cycle operation is completed and the training process 40 ends.

In the second discriminator updating operation s37, the second discriminator D' is updated by minimizing the second discriminator loss $L_{D'}$. For example, the objective function in this operation can be as follows.

$$\min_{D'} L_{D'}$$

After the training process 40 is completed, the probability density ratio r (x) can be determined using the obtained first discriminator D according to the formula (8).

The present disclosure further provides a method for estimating a robustness of a model for classifying trained based on a first dataset.

Figure 5:
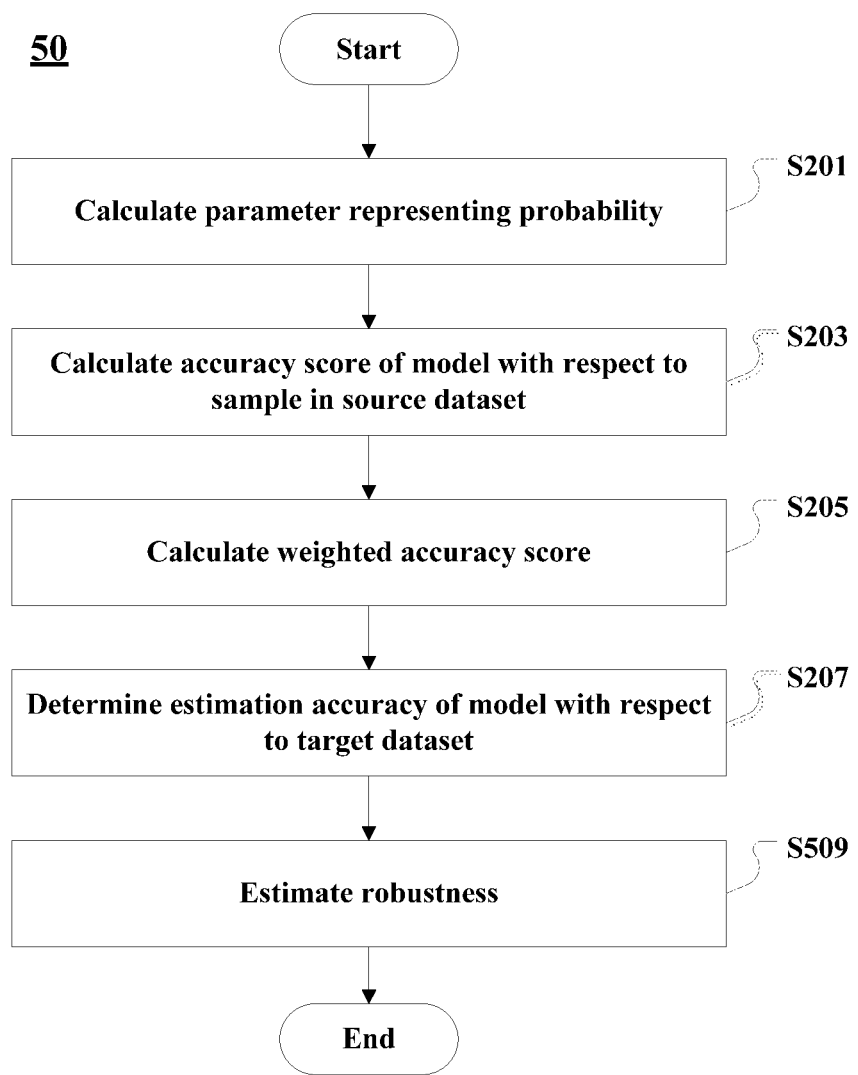
FIG. 5 shows a flowchart of a method for estimating a robustness of a model for classifying trained based on a source dataset according to an embodiment of the present disclosure.

FIG. 5 shows a flowchart of a method 50 for estimating a robustness of a model for classifying trained based on a source dataset according to an embodiment of the present disclosure. The method 50 comprises operations S201, S203, S205, S207, and S509, wherein details of operations S201, S203, S205, and S207 can be determined by referring to the description of FIG. 2. In operation S509, the robustness of the model is estimated according to the formula (6), that is, the robustness R of the model is estimated according to the accuracy $acc_{source}$ of the model with respect to the source dataset and the estimation accuracy $acc_{target}$ of the model with respect to the target dataset.

Figure 6:
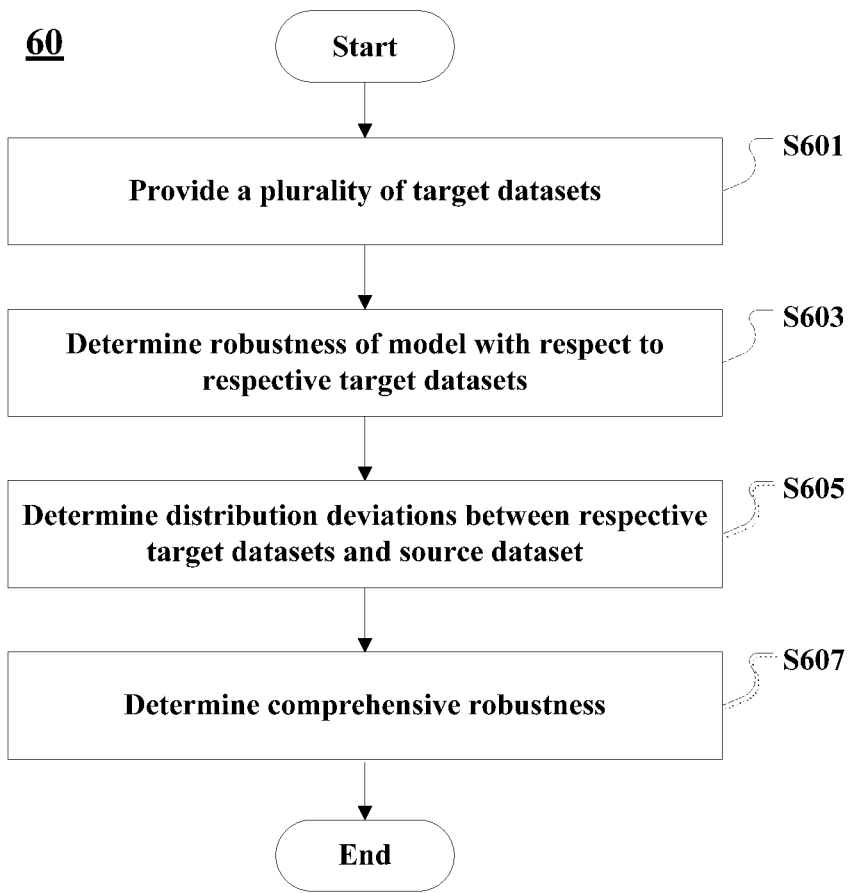
FIG. 6 shows a flowchart of a method for estimating a comprehensive robustness of a model for classifying according to an embodiment of the present disclosure.

The present disclosure further provides a method for estimating a comprehensive robustness of a model for classifying. FIG. 6 shows a flowchart of a method 60 for estimating a comprehensive robustness of a model for classifying according to an embodiment of the present disclosure.

In operation S601, a plurality of target datasets $\mathcal{T}=\{D_{Ti}, i=1, 2, \ldots, N\}$ are provided.

In operation S603, for each target dataset in the plurality of target datasets, a robustness of the model with respect to the target dataset is estimated using the method 50.

In operation S605, for each dataset in the plurality of target datasets, a distribution deviation between the target dataset and the source dataset used to train the model is determined.

In operation S607, the comprehensive robustness Rc of the model is determined based on the obtained multiple robustness and multiple distribution deviations. The formula for the comprehensive robustness is as follows.

$$Rc(f, D_S, \tau) = \sum_{D_{Ti} \in \tau} d(D_S, D_{Ti}) \cdot R(f, D_S, D_{Ti}) \quad (12)$$

where $$d(D_S, D_{Ti}) = \frac{e^{D(D_S, D_{Ti})}}{\sum_{i=1}^{N} e^{D(D_S, D_{Ti})}},$$

which represents a difference between the distributions of the two datasets ($D_{Ti}$ and $D_S$). The difference D ($D_S$, $D_{Ti}$) can be calculated using the existing methods, such as MMD, KL divergence and so on.

The present disclosure further provides a device for estimating an estimation accuracy of a model for classifying trained with a first dataset with respect to a second dataset. This will be described below with reference to FIG. 7.

Figure 7:
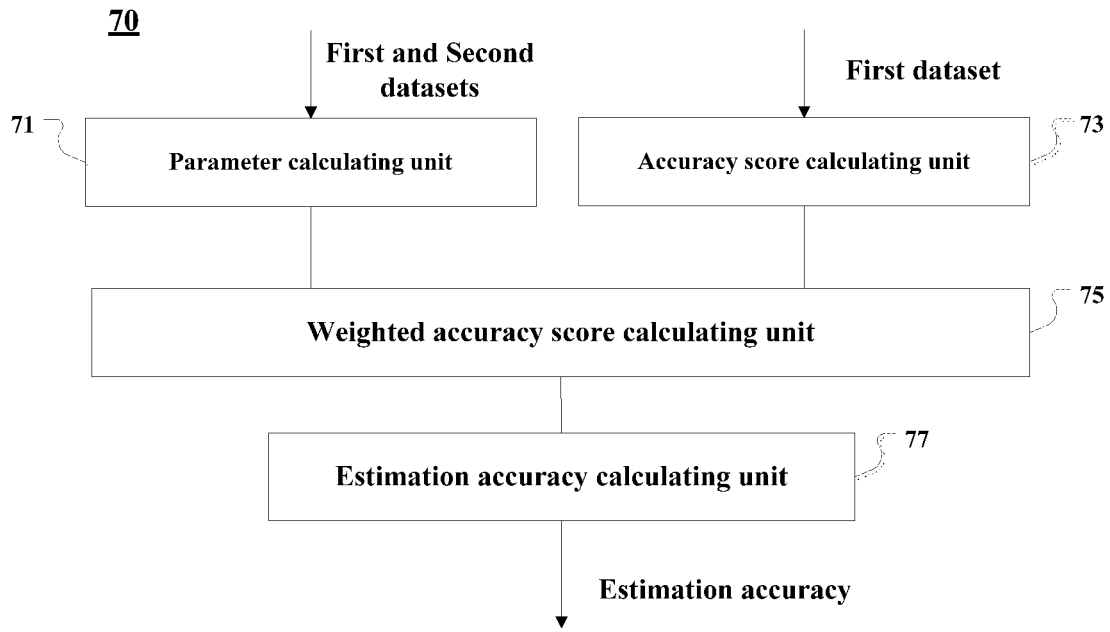
FIG. 7 shows an exemplary structural block diagram of a device for estimating an accuracy according to an embodiment of the present disclosure.

FIG. 7 shows an exemplary structural block diagram of a device 70 for estimating an accuracy according to an embodiment of the present disclosure. The device 70 comprises a parameter calculating unit 71, an accuracy score calculating unit 73, a weighted accuracy score calculating unit 75, and an estimated accuracy calculating unit 77. The parameter calculating unit 71 is configured to calculate a parameter representing a possibility that a sample in the first dataset appears in the second database. The accuracy score calculating unit 73 is configured to calculate an accuracy score of the model with respect to the sample in the first dataset. The weighted accuracy score calculation unit 75 is configured to calculate a weighted accuracy score of the model with respect to the sample in the first dataset, based on the accuracy score, by taking the parameter as a weight. The estimated accuracy calculation unit 77 is configured to calculate, as the estimation accuracy of the model with respect to the second dataset, an adjusted accuracy of the model with respect to the first dataset according to the weighted accuracy score. There is a correspondence between the device 70 and the method 20. Therefore, for further details of the device 70, reference may be made to the description of the method 20.

The present disclosure further provides a device for estimating a robustness of a model for classifying trained based on a first dataset. This will be described below with reference to FIG. 8.

Figure 8:
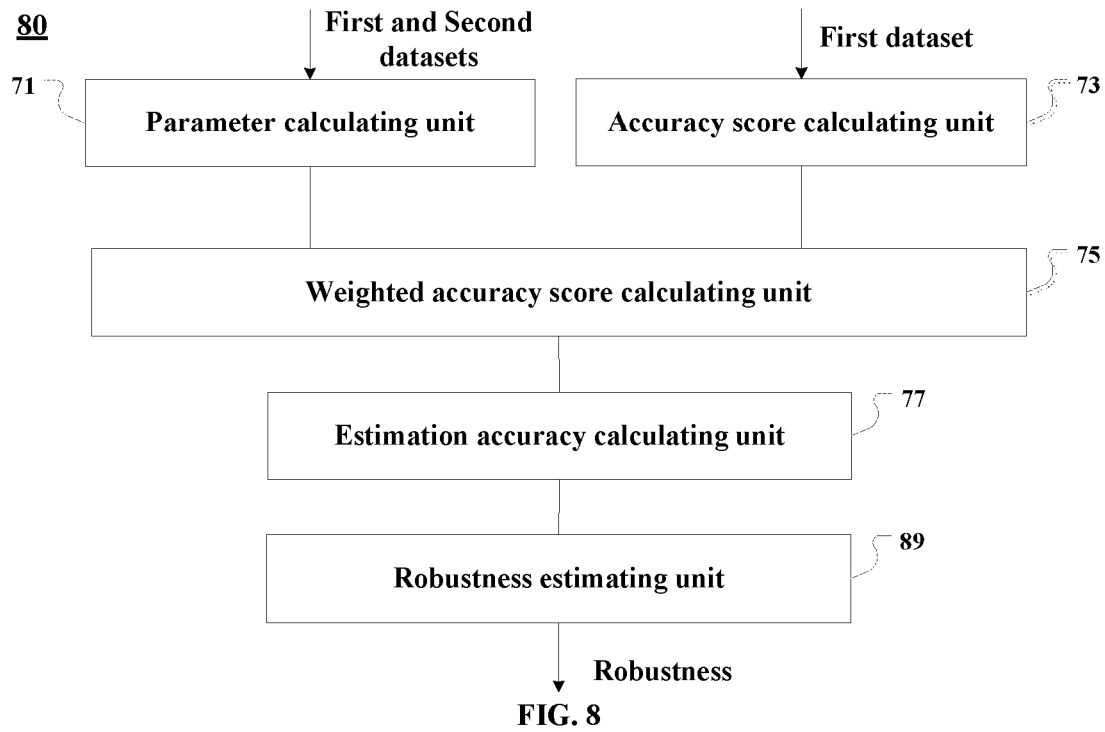
FIG. 8 shows an exemplary structural block diagram of a device for estimating a robustness according to an embodiment of the present disclosure.

FIG. 8 shows an exemplary structural block diagram of a device 80 for estimating a robustness according to an embodiment of the present disclosure. The device 80 comprises a parameter calculating unit 71, an accuracy score calculating unit 73, a weighted accuracy score calculating unit 75, an estimation accuracy calculating unit 77, and a robustness estimating unit 89. The parameter calculating unit 71 is configured to calculate a parameter representing a possibility that a sample in the first dataset appears in the second database. The accuracy score calculating unit 73 is configured to calculate an accuracy score of the model with respect to the sample in the first dataset. The weighted accuracy score calculating unit 75 is configured to calculate a weighted accuracy score of the model with respect to the sample in the first dataset, based on the accuracy score, by taking the parameter as a weight. The estimated accuracy calculating unit 77 is configured to calculate, as an estimated accuracy of the model with respect to the second dataset, an adjusted accuracy of the model with respect to the first dataset according to the weighted accuracy score. The robustness estimating unit 89 is configured to estimate the robustness of the model according to the accuracy of the model with respect to the first dataset and the estimated accuracy of the model with respect to the second dataset. There is a correspondence between the device 80 and the method 50. Therefore, for further details of the device 80, reference may be made to the description of the method 50.

The present disclosure further provides a computer-readable storage medium with a program stored thereon, the program, when executed by a computer, causing the computer to implement the above method. The storage medium includes, but is not limited to, a floppy disk, an optical disk, a magneto-optical disk, a memory card, a memory stick, and the like. The computer includes at least one processor. The computer includes: a desktop computer, a tablet computer, a portable computer, a smartphone, and a server.

According to an aspect of the present disclosure, there is further provided an information processing apparatus.

Figure 9:
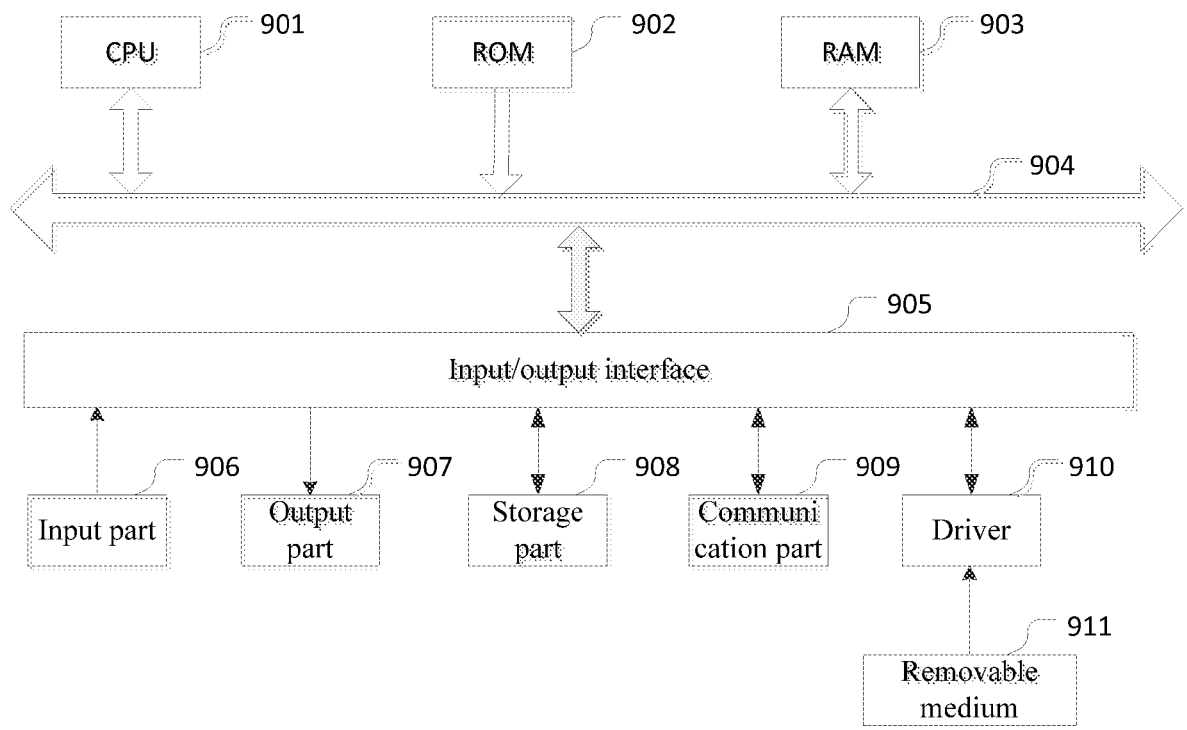
FIG. 9 is an exemplary block diagram of an information processing apparatus according to an embodiment of the present disclosure.

FIG. 9 is an exemplary block diagram of an information processing apparatus 900 according to an embodiment of the present disclosure. In FIG. 9, a central processing unit (CPU) 901 performs various processing according to a program stored in a read only memory (ROM) 902 or a program loaded from a storage part 908 to a random access memory (RAM) 903. In the RAM 903, data needed when the CPU 901 executes various processing and the like is also stored as needed.

The CPU 901, the ROM 902 and the RAM 903 are connected to each other via a bus 904. An input/output interface 905 is also connected to the bus 904.

The following components are connected to the input/output interface 905: an input part 906 including a soft keyboard and the like; an output part 907 including a display such as a liquid crystal display (LCD) and the like as well as a speaker and the like; a storage part 908 such as a hard disc; and a communication part 909 including a network interface card such as an LAN card, a modem and the like. The communication part 909 performs communication processing via a network such as the Internet, a local area network and a mobile network, or a combination thereof.

A driver 910 is also connected to the input/output interface 905 as needed. A removable medium 911 such as a semiconductor memory and the like is installed on the driver 910 as needed, so that a program read therefrom is installed to the storage part 908 as needed.

The CPU 901 can run a program for the inventor's method for estimating an accuracy or a robustness.

The methods, devices, information processing apparatus, and storage medium of the present disclosure at least can help to achieve one of the effects of: being capable of estimating, in a case where a target dataset is unlabeled (i.e., in a case where a label of the target dataset is unknown), an accuracy and robustness of a model with respect to the target dataset with a source dataset based on a probability density ratio; reducing the workload of evaluating the quality of a model; being capable of conveniently estimating an accuracy and robustness of a model; and being advantageous to screen, when selecting a model that processes a target dataset, models that have excellent performance with respect to the target dataset. That is, the methods, devices, and storage medium of the present disclosure at least can help to achieve one of the effects of: conveniently, accurately and efficiently estimating an accuracy and robustness of a model.

The above apparatuses and methods of this disclosure may be implemented by hardware, or by hardware in combination with software. The method detailed herein may be carried out via hardware, software modules executed by a processor, or a combination thereof.

Although the present invention has been disclosed above by describing the specific embodiments of the present invention, it should be understood that those skilled in the art can design various modifications (including combinations or replacements of features between the respective embodiments, where feasible), improvements or equivalents to the present invention within the spirit and scope of the appended claims. Such modifications, improvements or equivalents should also be considered to be included within the scope of protection of the present invention.

It should be emphasized that the term "including/comprising" as used herein refers to the presence of a feature, an element, an operation or an assembly, but does not exclude the presence or addition of one or more other features, elements, operations or assemblies.

In addition, the methods of the respective embodiments of the present invention are not limited to be performed in the chronological order described in the specification or shown in the drawings, but may also be performed in other chronological orders, in parallel, or independently. Therefore, the execution order of the methods described in this specification does not limit the technical scope of the present invention.

APPENDIXES

1. A method for estimating an estimation accuracy of a model for classifying trained with a first dataset with respect to a second dataset, characterized in that the method comprises:

calculating a parameter representing a possibility that a sample in the first dataset appears in the second database;

calculating an accuracy score of the model with respect to the sample in the first dataset;

calculating a weighted accuracy score of the model with respect to the sample in the first dataset, based on the accuracy score, by taking the parameter as a weight; and calculating, as the estimation accuracy of the model with respect to the second dataset, an adjusted accuracy of the model with respect to the first dataset according to the weighted accuracy score.

2. The method according to Appendix 1, wherein the parameter is a density ratio; and the density ratio represents a ratio of a probability density of the sample in the second dataset to a probability density of the sample in the first database.

3. The method according to Appendix 2, wherein the density ratio is determined based on a shift compensation network.

4. The method according to Appendix 3, wherein the shift compensation network comprises a first discriminator and a second discriminator;

a training condition of the first discriminator is to maximize a loss; and a training condition of the second discriminator is to minimize a loss.

5. The method according to Appendix 4, wherein the shift compensation network further comprises a feature extractor; and the feature extractor and the second discriminator are trained in a way of being adversarial to each other.

6. The method according to Appendix 5, wherein the density ratio is determined based on an output of the first discriminator of the shift compensation network.

7. The method according to Appendix 6, wherein for a sample in the first dataset, the accuracy score is one if a classifying result of the model is the same as a label of the sample, otherwise, is zero.

8. The method according to Appendix 5, wherein the shift compensation network further comprises a classifier;

parameters of the classifier and the feature extractor are updated by minimizing a combinational function of a classifying loss and a second discriminating loss.

9. The method according to Appendix 8, wherein the feature extractor and the classifier are pre-trained with the first dataset until the classifier converges.

10. The method according to Appendix 9, wherein the classifier is trained with the combinational function until the classifier converges again.

11. The method according to Appendix 1, wherein samples from the second dataset are not assigned with labels.

12. A method for estimating a robustness of a model for classifying trained based on a first dataset, characterized in that the method comprises:

calculating a parameter representing a possibility that a sample in the first dataset appears in the second database;

calculating an accuracy score of the model with respect to the sample in the first dataset;

calculating a weighted accuracy score of the model with respect to the sample in the first dataset, based on the accuracy score, by taking the parameter as a weight;

calculating, as an estimated accuracy of the model with respect to the second dataset, an adjusted accuracy of the model with respect to the first dataset according to the weighted accuracy score; and estimating the robustness of the model according to the accuracy of the model with respect to the first dataset and the estimated accuracy of the model with respect to the second dataset.

13. The method according to Appendix 12, wherein the robustness of the model is determined based on a ratio of a smaller accuracy in the first accuracy and the estimation accuracy of the model with respect to the first dataset to the first accuracy.

14. A device for estimating an estimation accuracy of a model for classifying trained with a first dataset with respect to a second dataset, characterized in that the device comprises:
a parameter calculating unit configured to calculate a parameter representing a possibility that a sample in the first dataset appears in the second database;
an accuracy score calculating unit configured to calculate an accuracy score of the model with respect to the sample in the first dataset;
a weighted accuracy score calculating unit configured to calculate a weighted accuracy score of the model with respect to the sample in the first dataset, based on the accuracy score, by taking the parameter as a weight; and
an estimation accuracy calculating unit configured to calculate, as the estimation accuracy of the model with respect to the second dataset, an adjusted accuracy of the model with respect to the first dataset according to the weighted accuracy score.

What is claimed is:

1. A method for estimating an estimation accuracy of a model for classifying which is trained with a first dataset with respect to a second dataset, the method comprising:
calculating a parameter representing a possibility that a sample in the first dataset appears in the second dataset;
calculating an accuracy score of the model with respect to the sample in the first dataset;
calculating a weighted accuracy score of the model with respect to the sample in the first dataset, based on the accuracy score, by taking the parameter as a weight; and
calculating, as the estimation accuracy of the model with respect to the second dataset, an adjusted accuracy of the model with respect to the first dataset according to the weighted accuracy score;
wherein the model is a model applied to one of scenarios of autonomous driving, face recognition, handwritten character recognition and health management.

2. The method according to claim 1, wherein the parameter is a density ratio; and
the density ratio represents a ratio of a probability density of the sample in the second dataset to a probability density of the sample in the first database.

3. The method according to claim 2, wherein the density ratio is determined based on a shift compensation network.

4. The method according to claim 3, wherein the shift compensation network comprises a first discriminator and a second discriminator;
a training condition of the first discriminator is to maximize a loss; and
a training condition of the second discriminator is to minimize a loss.

5. The method according to claim 4, wherein the shift compensation network further comprises a feature extractor; and
the feature extractor and the second discriminator are trained in a way of being adversarial to each other.

6. The method according to claim 5, wherein the density ratio is determined based on an output of the first discriminator of the shift compensation network.

7. The method according to claim 6, wherein for the sample in the first dataset, the accuracy score is one provided a classifying result of the model is the same as a label of the sample, and otherwise, the accuracy score is zero.

8. The method according to claim 5, wherein the shift compensation network further comprises a classifier;
parameters of the classifier and the feature extractor are updated by minimizing a combinational function of a classifying loss and a second discriminating loss.

9. The method according to claim 8, wherein the feature extractor and the classifier are pre-trained with the first dataset until the classifier converges.

10. The method according to claim 9, wherein the classifier is trained with the combinational function until the classifier converges again.

11. The method according to claim 1, wherein samples from the second dataset are not assigned with labels.

12. A method for estimating a robustness of a model for classifying which is trained based on a first dataset, the method comprises:
calculating a parameter representing a possibility that a sample in the first dataset appears in the second dataset;
calculating an accuracy score of the model with respect to the sample in the first dataset;
calculating a weighted accuracy score of the model with respect to the sample in the first dataset, based on the accuracy score, by taking the parameter as a weight;
calculating, as an estimated accuracy of the model with respect to the second dataset, an adjusted accuracy of the model with respect to the first dataset according to the weighted accuracy score; and
estimating the robustness of the model according to the accuracy of the model with respect to the first dataset and the estimated accuracy of the model with respect to the second dataset;
wherein the model is a model applied to one of scenarios of autonomous driving, face recognition, handwritten character recognition and health management.

13. The method according to claim 12, wherein the robustness of the model is determined based on a ratio of a smaller accuracy in the first accuracy and the estimation accuracy of the model with respect to the first dataset to the first accuracy.

14. A device for estimating an estimation accuracy of a model for classifying which is trained with a first dataset with respect to a second dataset, the device comprising:
a memory; and
a processor coupled to the memory and configured to:
calculate a parameter representing a possibility that a sample in the first dataset appears in the second dataset;
calculate an accuracy score of the model with respect to the sample in the first dataset;
calculate a weighted accuracy score of the model with respect to the sample in the first dataset, based on the accuracy score, by taking the parameter as a weight; and
calculate, as the estimation accuracy of the model with respect to the second dataset, an adjusted accuracy of the model with respect to the first dataset according to the weighted accuracy score, wherein the model is a model applied to one of scenarios of autonomous driving, face recognition, handwritten character recognition and health management.

* * * * *